United States Patent
Feinberg

(10) Patent No.: US 7,424,224 B2
(45) Date of Patent: Sep. 9, 2008

(54) SYSTEMS AND METHODS FOR PLACING LINE TERMINATING EQUIPMENT OF OPTICAL COMMUNICATION SYSTEMS IN CUSTOMER POINTS OF PRESENCE

(75) Inventor: Lee Feinberg, Silver Spring, MD (US)

(73) Assignee: Dorsal Networks, LLC, Broomfield, CO (US)

(*) Notice: Subject to any disclaimer, the term of this patent is extended or adjusted under 35 U.S.C. 154(b) by 0 days.

(21) Appl. No.: 11/534,892

(22) Filed: Sep. 25, 2006

(65) Prior Publication Data
US 2007/0019953 A1    Jan. 25, 2007

Related U.S. Application Data

(62) Division of application No. 09/962,535, filed on Sep. 26, 2001, now Pat. No. 7,113,706.

(60) Provisional application No. 60/311,353, filed on Aug. 13, 2001.

(51) Int. Cl.
*H04J 14/00* (2006.01)
*H04B 10/00* (2006.01)

(52) U.S. Cl. ................. 398/104; 398/1; 398/5

(58) Field of Classification Search .......... 398/1, 398/2, 4, 5, 66, 68, 70, 79, 81, 82, 89, 104, 398/105, 110, 148
See application file for complete search history.

(56) References Cited

U.S. PATENT DOCUMENTS

| | | | |
|---|---|---|---|
| 6,101,012 A | 8/2000 | Danagher et al. | |
| 6,151,144 A | 11/2000 | Knox | |
| 6,215,567 B1 | 4/2001 | Tochio | |
| 6,278,655 B2 | 8/2001 | Lancaster et al. | |
| 6,421,149 B2 * | 7/2002 | Tervonen et al. ............. | 398/9 |
| 6,680,948 B1 | 1/2004 | Majd et al. | |
| 6,731,877 B1 | 5/2004 | Cao | |
| 6,731,879 B1 | 5/2004 | Frisch et al. | |
| 2001/0003515 A1 | 6/2001 | Lancaster et al. | |
| 2001/0055309 A1 | 12/2001 | Altstaetter | |

(Continued)

FOREIGN PATENT DOCUMENTS

JP    2001144693    5/2001

OTHER PUBLICATIONS

AT&T Technical Journal: A Journal of the AT&T Companies, vol. 74, No. 1, Jan./Feb. 1995, 106 pages.

(Continued)

*Primary Examiner*—Dalzid Singh
(74) *Attorney, Agent, or Firm*—Thorp Reed & Armstrong, LLP

(57) ABSTRACT

A system for delivering optical signals to and from an undersea optical cable may include a cable landing station connected to the undersea optical cable and configured to convey a wavelength division multiplexed optical signal from the undersea optical cable. The system may also include a point of presence that includes wavelength division multiplexing equipment configured to convert the wavelength division multiplexed optical signal to a number of optical channels. At least one terrestrial optical fiber may be coupled between the cable landing station and the point of presence to transport the wavelength division multiplexed optical signal from the cable landing station to the point of presence.

4 Claims, 10 Drawing Sheets

U.S. PATENT DOCUMENTS

2002/0095688 A1    7/2002    Rich
2003/0005095 A1    1/2003    Fee
2004/0105136 A1    6/2004    Feinberg

OTHER PUBLICATIONS

William C, Marra et al.: "Africa ONE: The Africa Optical Network," IEEE Communications Magazine, Feb. 1996, pp. 50-57.

Michel W. Chbat, et al.: "Toward Wide-Scale All-Optical Transparent Networking: The ACTS Optical Pan-European Network (OPEN) Project," IEEE Journal of Selected Areas in Communications, vol. 16, No. 7, Sep. 1998, pp. 1226-1244.

Feinberg, Lee, co-pending U.S. Appl. No. 09/962,535, filed Sep. 26, 2001, "Systems and Methods for Placing Line Terminating Equipment of Optical Communication Systems in Customer Points of Presence".

* cited by examiner

_US 7,424,224 B2_

SYSTEMS AND METHODS FOR PLACING LINE TERMINATING EQUIPMENT OF OPTICAL COMMUNICATION SYSTEMS IN CUSTOMER POINTS OF PRESENCE

RELATED APPLICATION

This application is a divisional of U.S. patent application Ser. No. 09/962,535. filed Sep. 26, 2001, which claims the benefit of priority under 35U.S.C. § 119(e) of a provisional application, Ser. No. 60/311,353, filed Aug. 13, 2001, the disclosures of both of which are incorporated herein by reference.

BACKGROUND OF THE INVENTION

1. Field of the Invention

This invention relates generally to optical communication networks and, more particularly, to methods and systems for distributing equipment associated with optical communication systems.

2. Description of Related Art

Recently, optical communications have become established as a next generation communication technology. Advances in optical fibers that carry optical data signals, and in techniques (e.g., wavelength division multiplexing (WDM)) for efficiently using the available bandwidth of such fibers, have caused optical technologies to be utilized in state-of-the-art long haul communication systems, As used herein, "WDM" may include either or both of the functions of multiplexing (i.e., multiple signals into one signal) and demultiplexing (i.e., one signal into multiple signals).

Depending upon the relative locations of the data source and the intended recipient, optical data signals may traverse different optical communication systems between the two locations. On example of this occurs in trans-oceanic (e.g., trans-Atlantic) data connections. For example, optical signals may travel along both a terrestrial optical communication system and a submarine optical communication system.

FIG. 1 is a schematic diagram of an exemplary optical communication system 100 that includes an undersea, or submarine, portion. The optical communication system 100 may include two land-based, or terrestrial, WDM terminals 110 and 140 that are connected by a submarine optical fiber 120, perhaps in the form of an undersea cable. The submarine optical fiber 120 may connect to one or more line units 130 that are used to amplify the optical signal in the fiber 120. Line units 130 are also sometimes referred to as "repeaters." Although communication may be shown in one direction in FIG. 1 and elsewhere herein, those skilled in the art will appreciate that communication may be bi-directional, for example by using a pair of optical fibers or other known methods of bi-directional optical communication.

For "long haul" (e.g., greater than or equal to several hundred kilometers) optical communications, the optical signal may be periodically amplified to compensate for attenuation in the fiber 120. As many line units 130 are used as necessary to amplify the transmitted signal so that it arrives at WDM terminal 140 with sufficient signal strength (and quality) to be successfully detected and transformed back into a terrestrial optical signal. The terminals 110 and 140 may contain all of the components needed to process the terrestrial optical signals to and from submarine optical signals.

FIG. 2 is a block diagram of an exemplary terminal unit 110 of the optical communication system 100. The terminal unit 110 may include long reach transmitters/receivers (LRTRs) 210, WDM and optical conditioning equipment 220, link monitor equipment 230, line current equipment 240, a backplane 250, and a network management system 260. All of this equipment has typically been housed in one or more cabinets (not shown) disposed at a cable landing site (also referred to as a cable landing station, or merely "cable station") near the point at which the undersea cable 120 exits the submarine optical communication system.

The LRTRs 210 may be configured to convert terrestrial optical signals into an optical format suitable for long haul transmission. The LRTRs 210 also may be configured to convert the undersea optical signal back into its original terrestrial format and provide forward error correction for the submarine line. The WDM and optical conditioning unlit 220 may be configured to multiplex and amplify the optical signals in preparation for their transmission over cable 120 in a transmitting direction. In the opposite (i.e., receiving) direction, the WDM and optical conditioning unit 220 may demultiplex optical signals received from cable 120. The link monitor equipment 230 may be configured to monitor the undersea optical signals and undersea equipment for proper operation. The line current equipment 240, which may also be referred to as power feed equipment (PFE), provides power to, for example, the undersea line units 130 coupled to the undersea cable 120.

As these optical systems are upgraded and/or new submarine optical communication systems are deployed, the number of channels and number of optical fibers associated with each system may increase dramatically. Retrofitting existing cable landing stations to handle new equipment may not be commercially feasible. At the same time, acquiring new landing sites may be equally challenging.

Thus, there is a need in the art to expand information capacity by modifying or adding equipment, while minimizing access to cable landing stations and space usage therein.

SUMMARY OF THE INVENTION

Systems and processes consistent with the principles of the invention may, among other things, allow multiplexing and other processing of a signal from an undersea optical cable to be performed at a customer's point of presence.

In accordance with one purpose of the invention as embodied and broadly described herein, a system for delivering optical signals to and from an undersea optical cable may include a cable landing station connected to the undersea optical cable and configured to convey a wavelength division multiplexed optical signal from the undersea optical cable. The system may also include a point of presence that includes wavelength division multiplexing equipment configured to convert the wavelength division multiplexed optical signal to a number of optical channels. At least one terrestrial optical fiber may be coupled between the cable landing station and the point of presence to transport the wavelength division multiplexed optical signal from the cable landing station to the point of presence.

In another implementation consistent with principles of the invention, a method for transmitting optical signals may include receiving a multiplexed optical signal via an underwater cable. The multiplexed optical signal may be transmitted to one or more remote devices via a terrestrial fiber.

In a further implementation consistent with principles of the invention, a system for delivering optical signals to and from an undersea optical cable may include an optical splitter configured to split a wavelength division multiplexed optical signal from the undersea optical cable into two split signals. The system may also include two diversely routed terrestrial optical fibers coupled to the optical splitter to respectively transport the two split signals to a remote location from the optical splitter, An optical switch in the remote location may be configured to receive the two split signals and to transmit one of the two received split signals. Wavelength division multiplexing equipment in the remote location may receive the transmitted one split signal and to produce a plurality of optical signals therefrom.

In still another implementation consistent with principles of the invention, a cable landing station for delivering optical signals to and from an undersea optical cable may include an optical splitter may be configured to separate an optical signal from the undersea optical cable and to transmit the optical signal along a terrestrial optical fiber without performing wavelength division demultiplexing on the signal prior to transmission. An amplifier may be optically coupled to the optical splitter and configured to amplify the optical signal.

In yet another implementation consistent with principles of the invention, a method of performing failure routing in an optical system may include determining whether a failure exists in a single channel of an optical signal received on a first terrestrial optical fiber, and ascertaining whether a failure exists in multiple channels of the optical signal received on a first terrestrial optical fiber or whether a loss of the optical signal has occurred. A second terrestrial optical fiber may be selected by switching if said ascertaining ascertains that the failure exists. The method may also verify whether a failure exists in multiple channels of an optical signal received on the second terrestrial optical fiber or whether a loss of the optical signal has occurred. A diversely routed submarine cable may be selected by switching if said verifying determines that the failure exists.

In another implementation consistent with principles of the invention, a method for delivering optical signals to and from an undersea optical cable may include splitting a wavelength division multiplexed optical signal from the undersea optical cable into two split signals, and transporting the two split signals to a remote location from the optical splitter. The two split signals may be received, and one of the two received split signals may be forwarded. The method may also include wavelength division demultiplexing the forwarded one split signal to produce a number of optical signals.

In still another implementation consistent with principles of the invention, a land-based network device may include a wavelength division multiplexer connected to a terrestrial optical link and configured to receive a multiplexed optical signal from a remote submarine cable landing station via the terrestrial optical link. The wavelength division multiplexer may also be configured to convert the multiplexed optical signal into a plurality of optical channels. At least one transmitter may be configured to transmit the plurality of optical channels.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

As described herein, in one implementation, wavelength division multiplexing and submarine line termination equipment may be located at a customer's point of presence. The location of such equipment may reduce the amount of access to and space needed in a cable landing station.

EXEMPLARY SYSTEM CONFIGURATIONS

Figure 1:
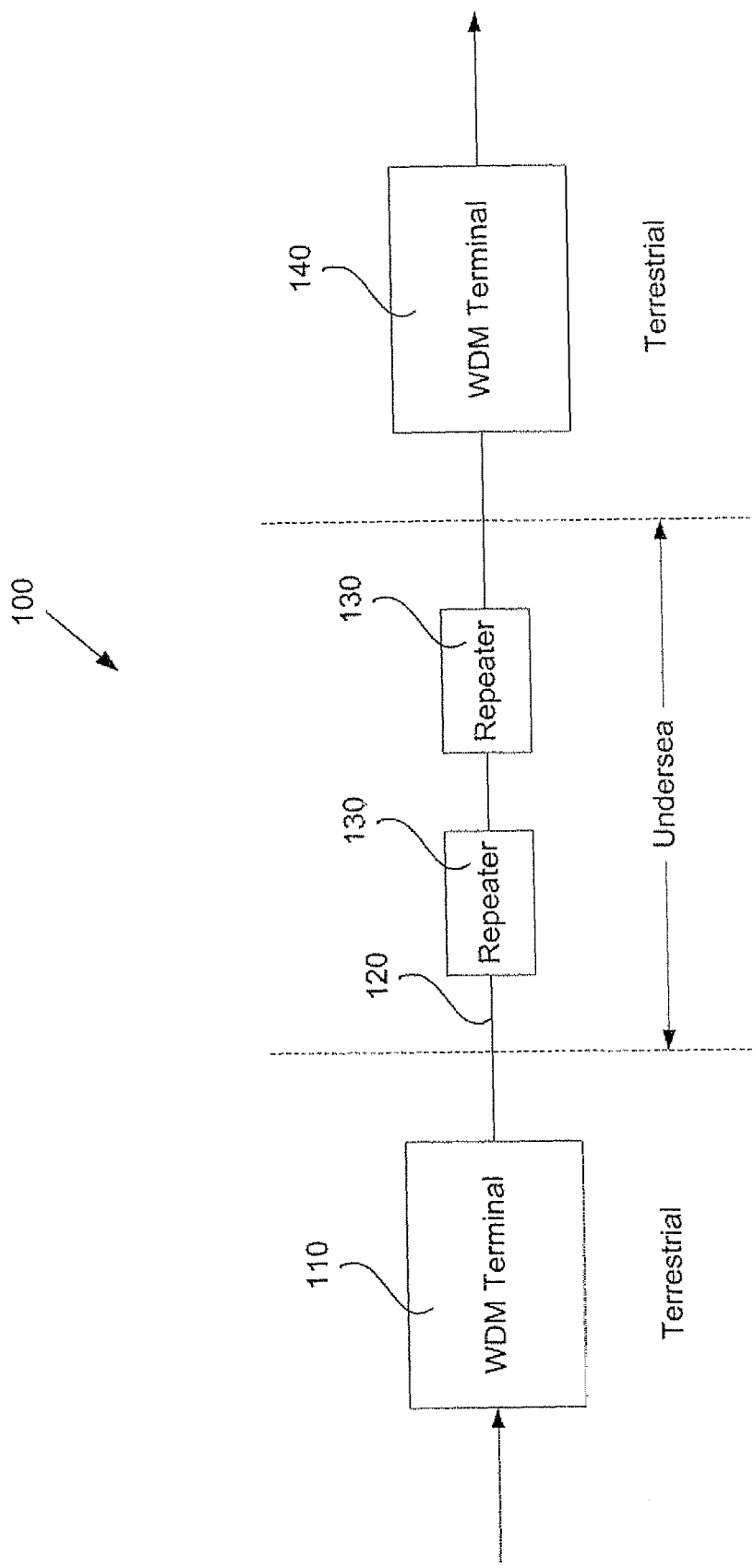
FIG. 1 is a schematic diagram of an exemplary optical communication system.
Figure 2:
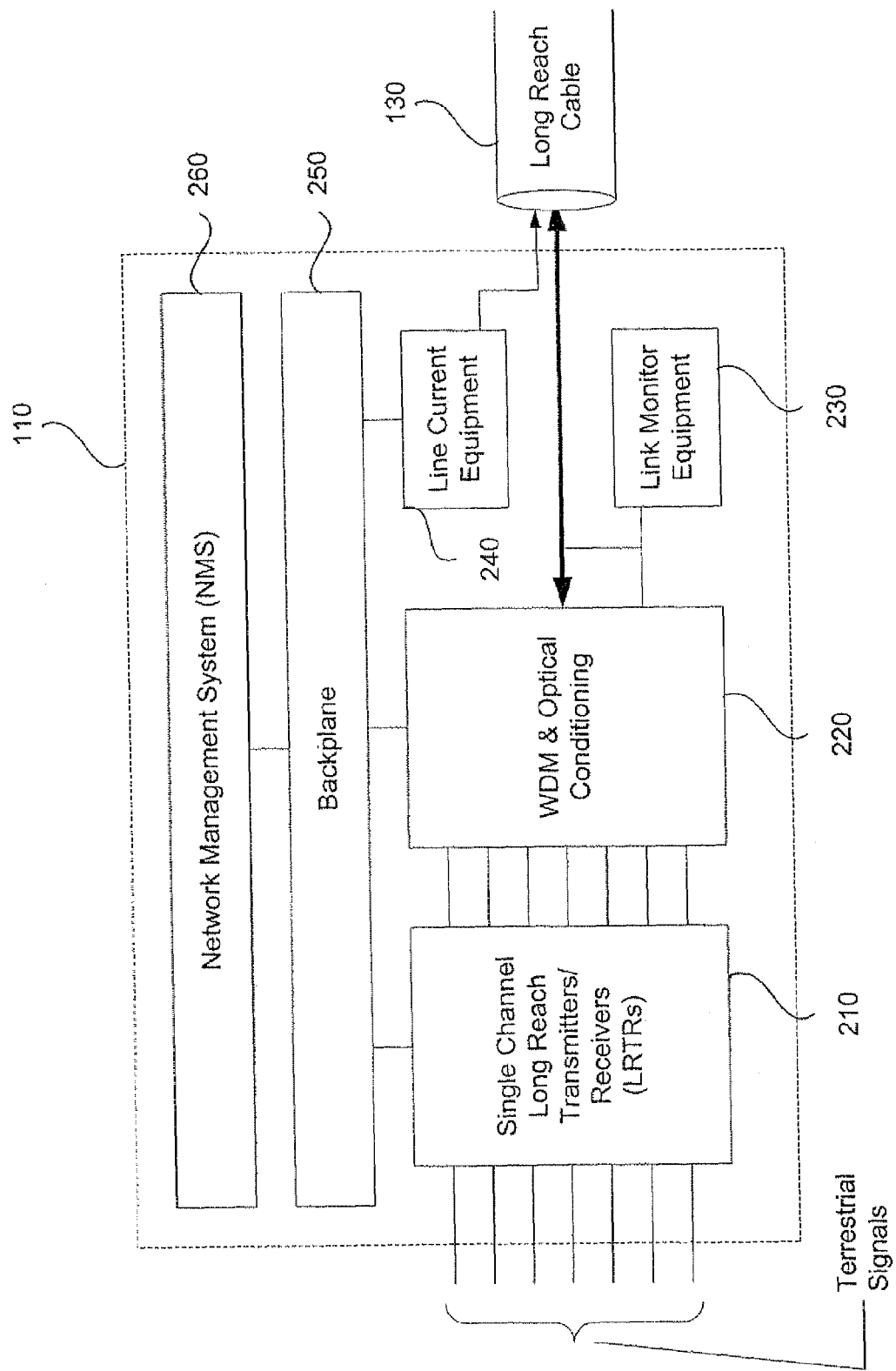
FIG. 2 is a block diagram of an exemplary terminal unit of the optical communication system in FIG. 1.
Figure 3:
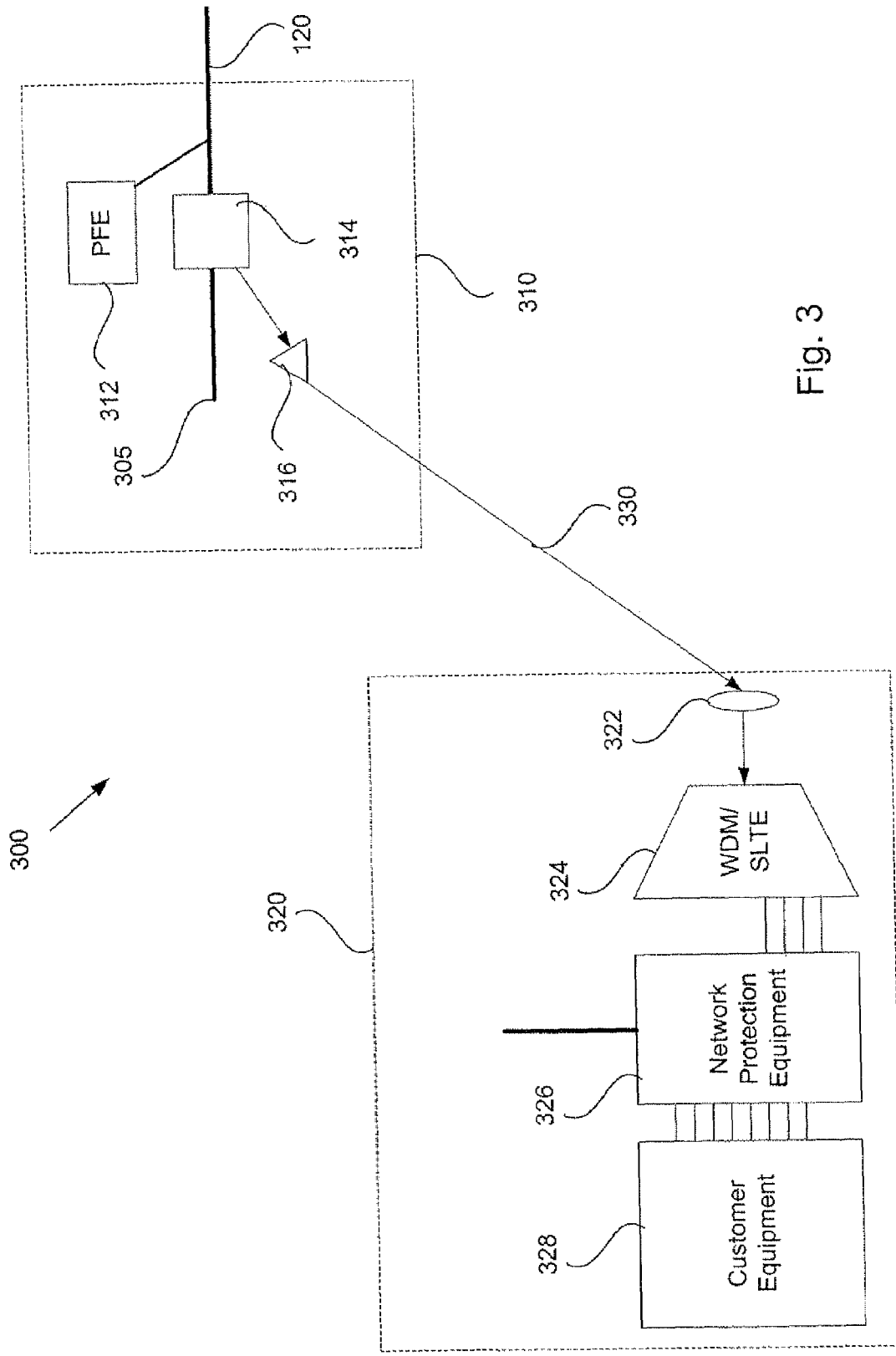
FIG. 3 is a block diagram of an exemplary optical system consistent with the principles of the present invention where a WDM unit is not housed in the cable landing station.

FIG. 3 is a block diagram of an exemplary optical system 300 consistent with the principles of the present invention. The optical system may include an undersea cable 120, a cable landing station 310, a point of presence (POP) 320, and a terrestrial fiber 330 connecting the cable station 310 and the POP 320. Typically, a company which provides optical signals from the undersea cable 120 may be distinct from the company that owns and operates the POP 320. As the latter company may be a customer of the former company, the POP 320 may also be referred to as a "customer's POP."

The cable landing station 310 may include an optical cable 305, power feed equipment (PFE) 312, a branching device 314, and an optical amplifier 316. These components allow the cable landing station 310 to forward a received WDM submarine optical signal to the POP 320. The optical cable 305 may carry the same signals as the submarine optical cable 120, and it may carry the signals to other equipment in the cable landing station 310 or to other POPs, The PFE 312 may be configured to provide power to, for example, the undersea line units 130 coupled to tile undersea cable 120. The branching device 314 may be configured to route the WDM submarine optical signal from the undersea cable 120 to the POP 320 along the optical fiber 330. The optical amplifier 316 may be provided to amplify the WDM signal by a suitable amount to reach the POP 320 with sufficient strength. If the signal will have sufficient strength at the POP 320 without amplification, the optical amplifier 316 need not be provided. Examples of the optical amplifier 316 may include a narrowband erbium doped fiber amplifier (EDFA) or a Raman amplifier.

The terrestrial fiber link 330 may be, for example, 20 km or more in length. Although shown as a single line in FIG. 3, the fiber link 330 may include a pair or pairs of fibers configured to provide bi-directional (i.e., transmitting and receiving) communication.

The POP 320 may include an amount of dispersion compensating fiber (DCF) 322, a WDM/submarine line terminating equipment (SLTE) unit 324, network protection equipment (NPE) 326, and other customer equipment 328. The DCF 322 may be inserted in the optical path to compensate for any additional dispersion experienced by the WDM signal as it traverses the terrestrial fiber link 330. Alternately, the DCF 322 may be contained in, for example, the WDM/SLTE unit 324. Line terminating equipment of this type may contain an amount (e.g., 70 km) of DCF to "pre-compensate" for downstream fiber dispersion. Accordingly, the system 300 may be designed to take advantage of any DCF already present in the WDM/SLTE unit 324.

The WDM/SLTE unit 324 may be configured to demultiplex, detect and, optionally, error correction decode the WDM signal. The WDM/SLTE unit 324 may then output terrestrial speed optical signals (e.g., OC 192 SONET signals) to network protection equipment 326. In the opposite direction, the WDM/SLTE unit 324 may process a terrestrial optical signal (e.g., an OC 192 signal) into a submarine WDM signal. For example, the WDM/SLTE unit 324 may error correction code the terrestrial signals, preemphasize them (to compensate for long haul non-linearities in the submarine line 120), modulate each onto a predetermined wavelength channel with a suitable modulation (e.g., non-return to zero (NRZ)) and wave division multiplex the terrestrial signals together.

The network protection equipment 326, in addition to protecting the customer equipment 328, may provide the OC 192 data to the customer equipment 328, or to other POPs (not shown) that do not include the line terminating equipment 324.

The system 300 includes a single terrestrial fiber link 330 between the cable terminal 310 and the POP 320. The risk that such a single link 330 may be inadvertently cut might be unacceptable. Moreover, a system operator may be unable to determine whether errors in the OC-192 data streams provided to the customer equipment 328 are from problems with the undersea optical cable 120, or the terrestrial link 330. These issues may be addressed by one or more of the exemplary systems illustrated in FIGS. 4-9.

Figure 4:
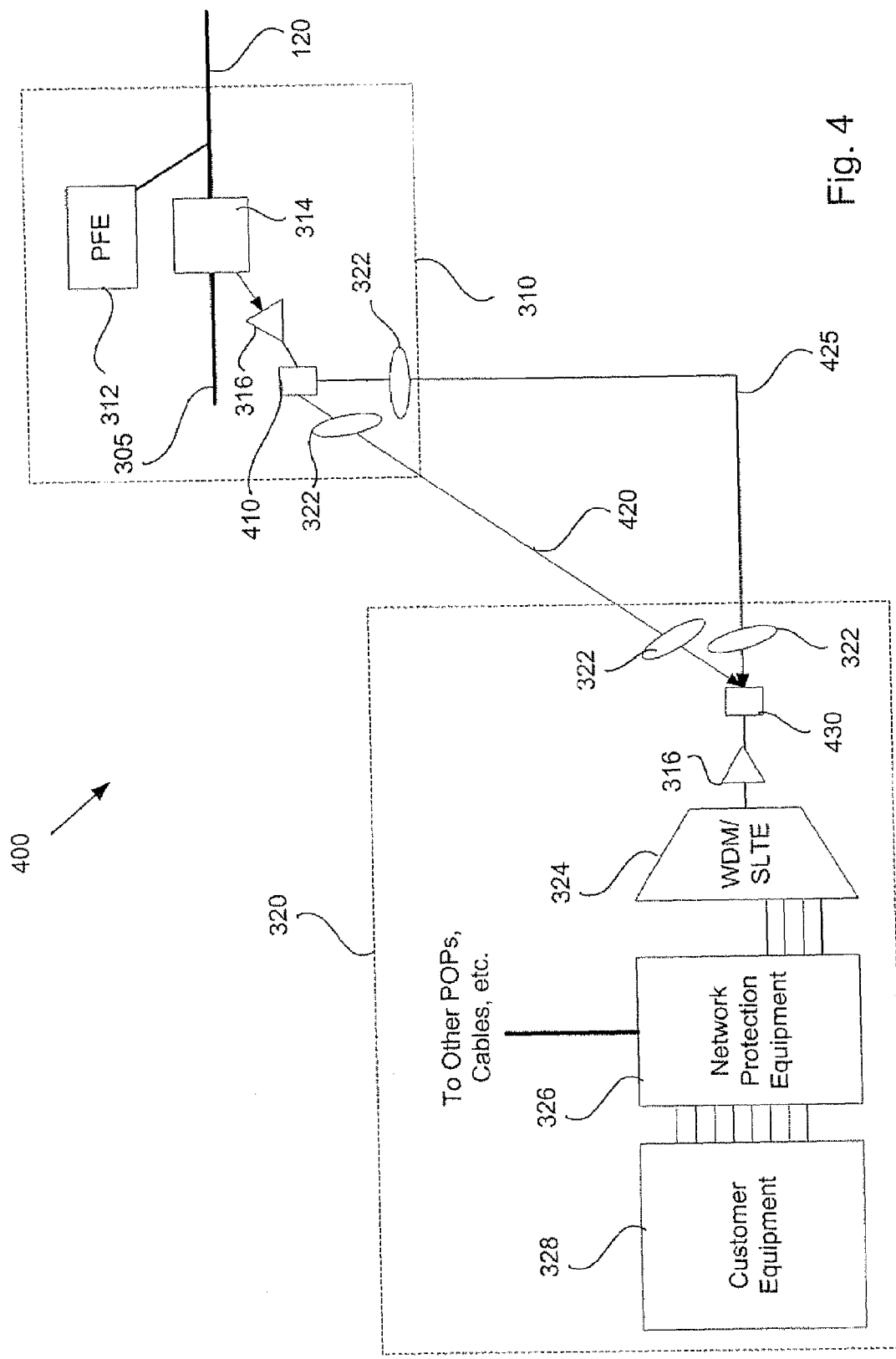
FIG. 4 is a block diagram of an exemplary optical system consistent with the principles of the present invention incorporating a 1+1 terrestrial fiber arrangement.

FIG. 4 is a block diagram of an exemplary optical system 400 that incorporates a 1+1 terrestrial fiber arrangement. Where elements have the same reference numerals as in FIG. 3, these elements will not be described again. Optical system 400 may include an optical splitter 410 in the cable station 310, first and second terrestrial fiber links 420 and 425, and an optical switch 430 in the POP 320. The first and second terrestrial fiber links 420 and 425 are typically spatially separate, and provide redundancy and protection against a fiber cut. Such dual fiber redundancy may be termed "1+1 protection."

The splitter 410 may include, for example, a 3 db, 50/50 splitter, which may receive the WDM optical data signal from the branching unit 314 and split the signal in two. One of the split signals may be transmitted over fiber link 420, and the other split signal may be transmitted over fiber link 425. Each of the split signals may be attenuated by about 3 dB with respect to the WDM optical signal input to the splitter 410. The switch 430 may include, for example, a 1×2 optical switch configured to selectively pass the WDM signal from either fiber 420 or fiber 425 to WDM/SLTE unit 324. With the switch configured in such a manner if, for example, problems occur on fiber 420, then the system 400 can switch over to fiber 425. Operational details of the switch 430 will be discussed farther with respect to FIG. 9.

As mentioned previously, although only one transmission direction is shown in FIG. 4, the fiber links 420 and 425 may each include a pair of fibers. Although not shown, the cable station 310 may include a switch 430, and the POP 320 may include a splitter 410 for transmission in the opposite direction.

Figure 5:
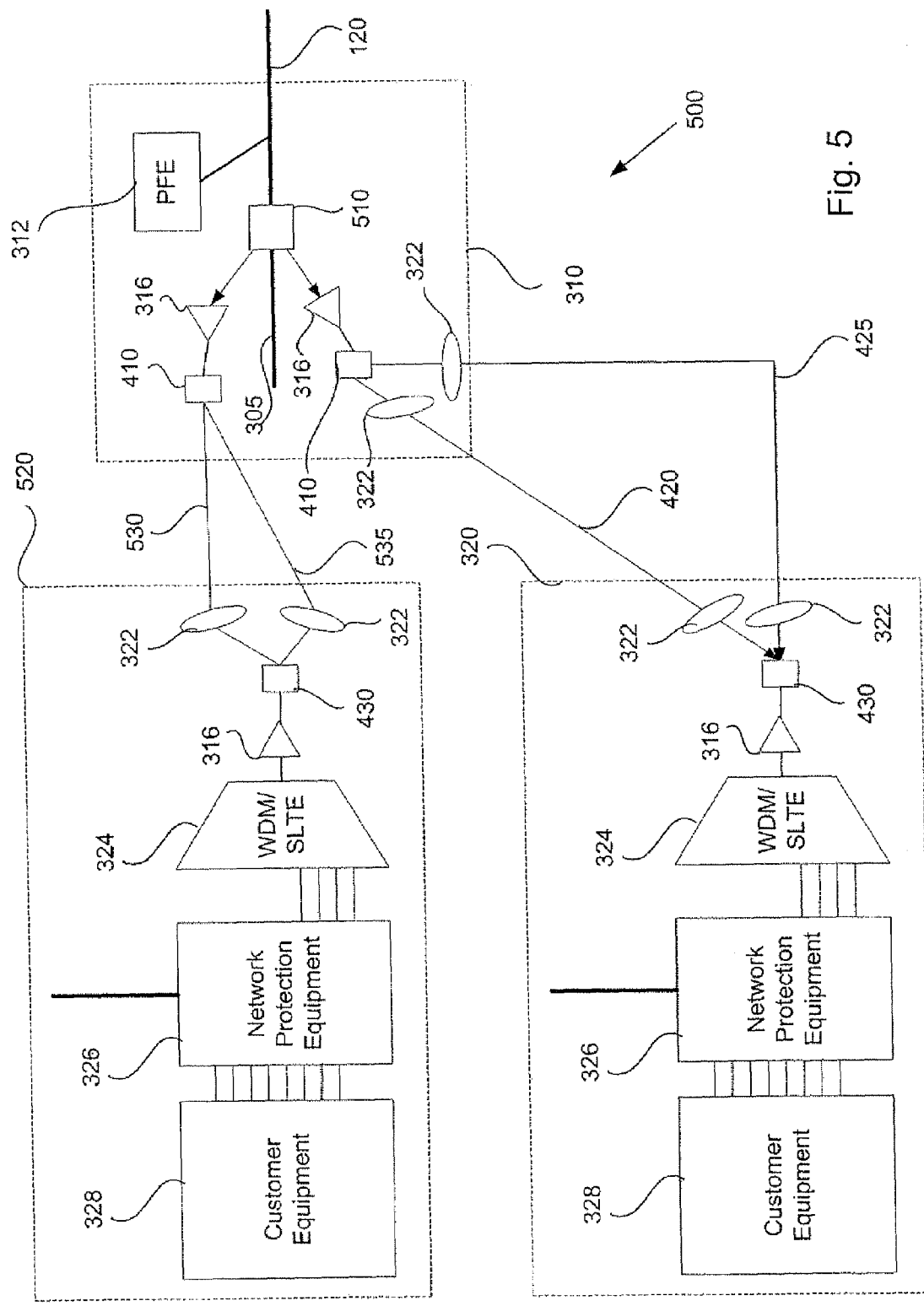
FIG. 5 is a block diagram of an exemplary optical system consistent with the principles of the present invention for transmitting WDM data to two points of presence.

FIG. 5 is a block diagram of an exemplary optical system 500 that transmits data to and from two POPs. Where elements have the same reference numerals as in FIGS. 3 and 4, these elements will not be described again. Optical system 500 may include an optical splitter 510 in the cable station 310, a second POP 520, and third and fourth terrestrial fiber links 530 and 535 connecting the cable station 310 to the second POP 520. The third and fourth terrestrial fiber links 530 and 535 provide 1+1 protection for the second POP 520.

The splitter 510 may include a wavelength splitter or a 1×N broadband optical splitter. A wavelength splitter may send one range of wavelengths to POP 320 and another range of wavelengths to POP 520. In one implementation, the 1×N broadband optical splitter may include the 3 dB 50/50 broadband splitter 410. However, system 500 may include more than the two POPs 320 and 520. In such a case, the splitter 510 may be a 1×3, 1×4, etc. broadband optical splitter. Alternately, the splitter 510 may be some combination of wavelength splitters and 1×N broadband splitters, depending on a number and configuration of POPs in system 500. In the opposite (i.e., receiving) direction, the splitter 510 may include an N to 1 broadband combiner or a wavelength combiner to produce the WDM signal on undersea cable 120.

In another implementation consistent with the present invention, the cable station 310 may receive a number of distinct fiber pairs (e.g., four or more). The cable station may include hardware to route the distinct fiber pairs to different POPs (e.g., one distinct fiber pair to POP 320, another distinct fiber pair to POP 520, etc.).

In a further implementation consistent with the present invention, the POPs 320 and 520 may be connected to each other via terrestrial fiber links (not shown). Such connections would provide "ring" connectivity among the POPs 320/520 and the landing station 310. In such a ring-connected system, some channels may terminate in POP 320 and other channels may terminate in POP 520. The channels which do not terminate in a given POP may be passed through to another POP to provide protection against the destruction of one or more terrestrial fiber links. In another implementation consistent with the present invention, a number of POPs each may be connected to two or more other POPs. Such so-called "mesh" connectivity provides a larger number of paths to a given POP in the event of a fiber failure than, for instance, ring connectivity. The added redundancy of mesh connectivity comes at the expense of a larger number of terrestrial fiber links among the POPs.

Figure 6:
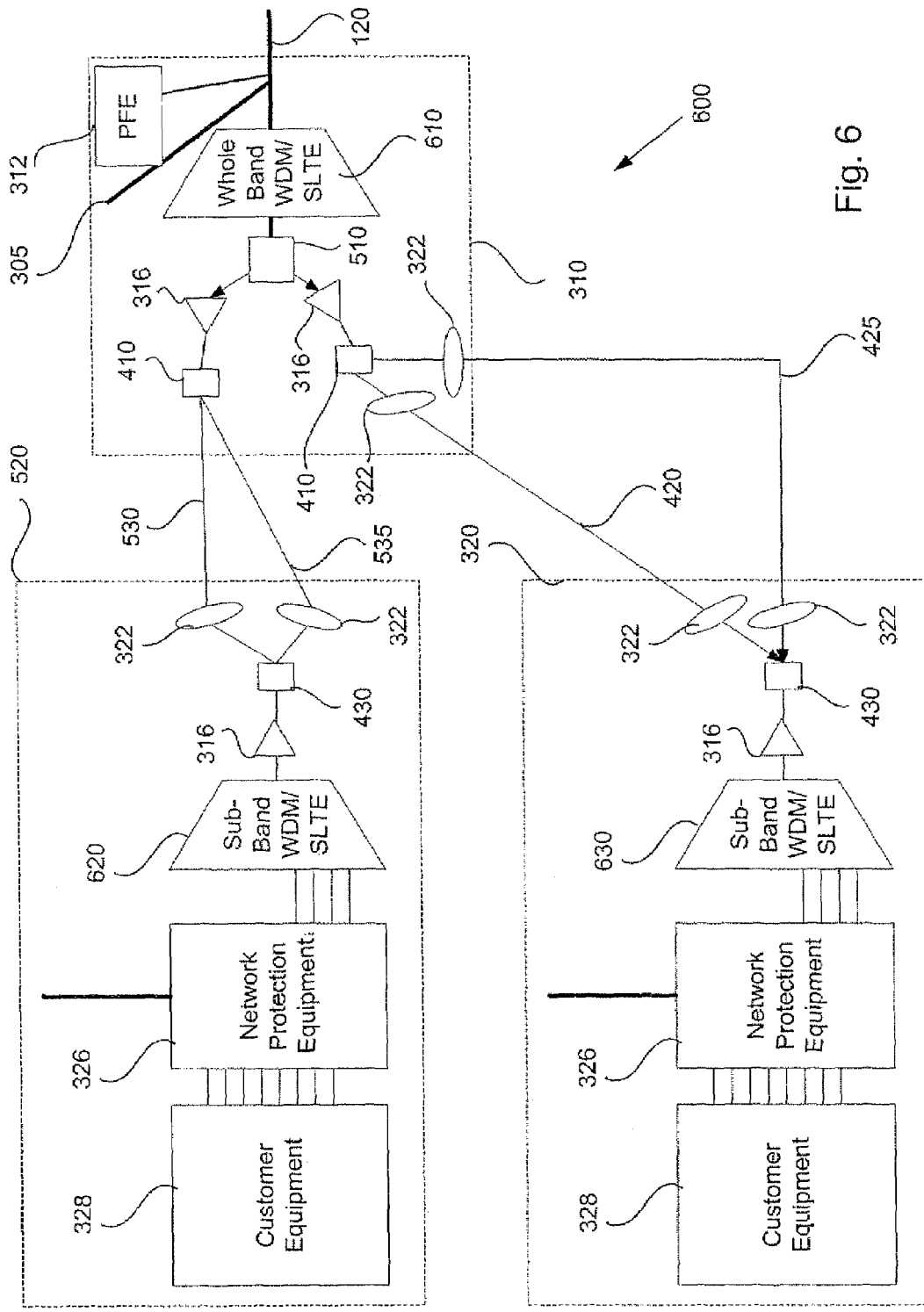
FIG. 6 is a block diagram of an exemplary optical system consistent with the principles of the present invention with sub-band WDMs in the points of presence.

FIG. 6 is a block diagram of an exemplary optical system 600 with sub-band WDMs in the points of presence. Where elements have the same reference numerals as in FIG. 3-5, these elements will not be described again. Optical system 600 may include a whole band WDM/SLTE 610 in the cable station 310 and sub-band WDM/SLTEs 620 and 630 in the POPs 520 and 320. The WDM signals from the submarine cable 120 are partially demultiplexed/multiplexed by whole band WDM/SLTE 610 and further demultiplexed/multiplexed by sub-band WDM/SLTls 620 and 630. For example, the whole band WDM/SLTE 610 may split the WDM signal into two signals in different wavelength regions. The first of these signals may be fully demultiplexed/multiplexed by sub-band WDM/SLTE 620, and the second of these may be fully demultiplexed/multiplexed by sub-band WDM/SLTE 630.

Figure 7:
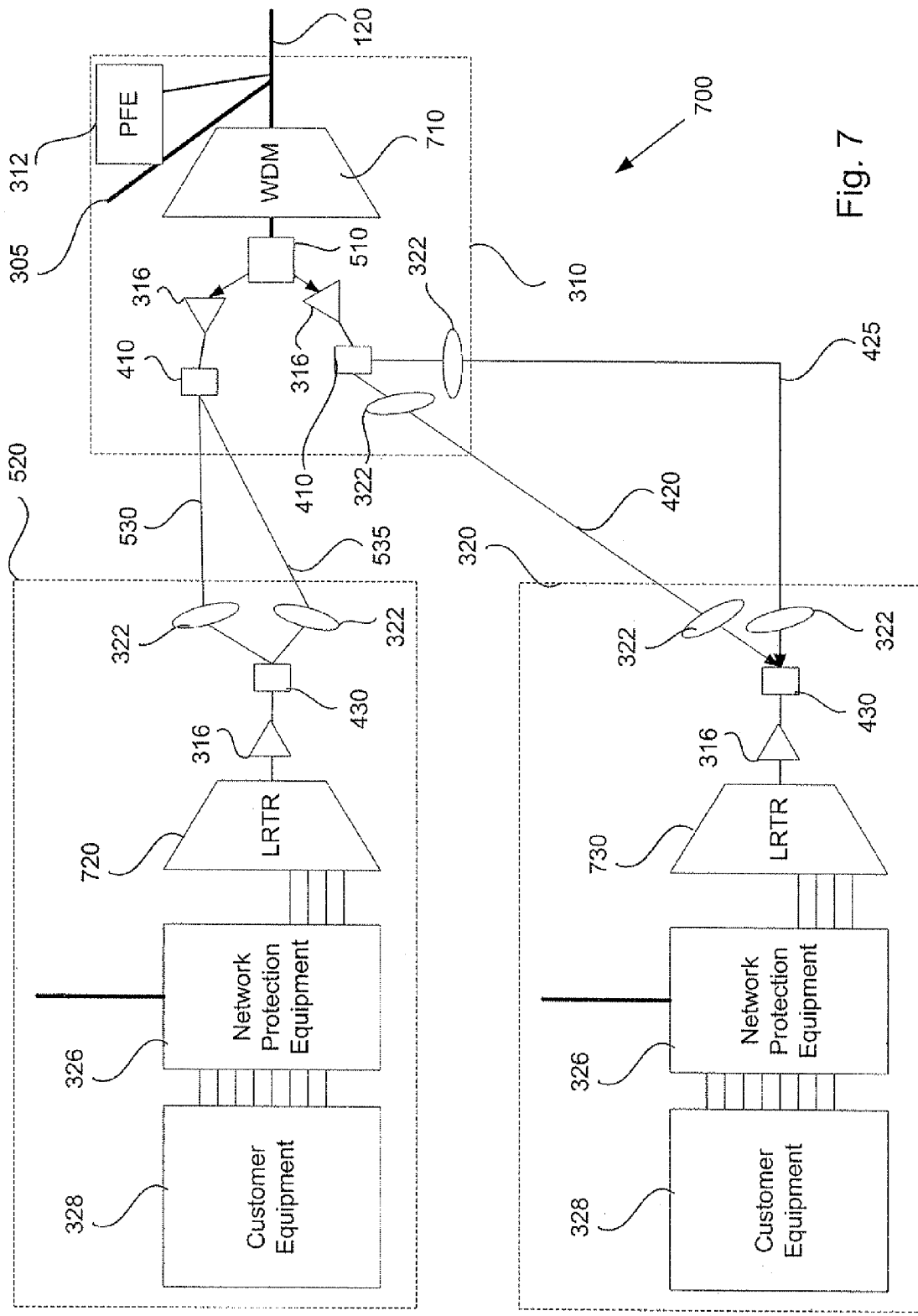
FIG. 7 is a block diagram of an exemplary optical system consistent with the principles of the present invention with LRTRs in the points of presence.

FIG. 7 is a block diagram of an exemplary optical system 700 consistent with the principles of the present invention with LRTRs in the points of presence. Where elements have the same reference numerals as in FIG. 3-6, these elements will not be described again. The system 700 may include a WDM unit 710 in the cable station 310, and LRTRs 720 and 730 in the POPs 520 and 320. The WDM unit 710 may provide full multiplexing/demultiplexing for the WDM signal from and to the submarine cable 120. That is, the WDM unit 710 may output a single wavelength to each of the POPs 520 and 320. The LRTRs 720/730 may be configured to convert terrestrial optical signals into an optical format suitable for long haul transmission over the cable 120. The LRTRs 720/730 also may be configured to convert the undersea optical signal back into its original terrestrial format and provide forward error correction. The system 800 may be desirable when, for example, there are a large number of POPs.

Figure 8:
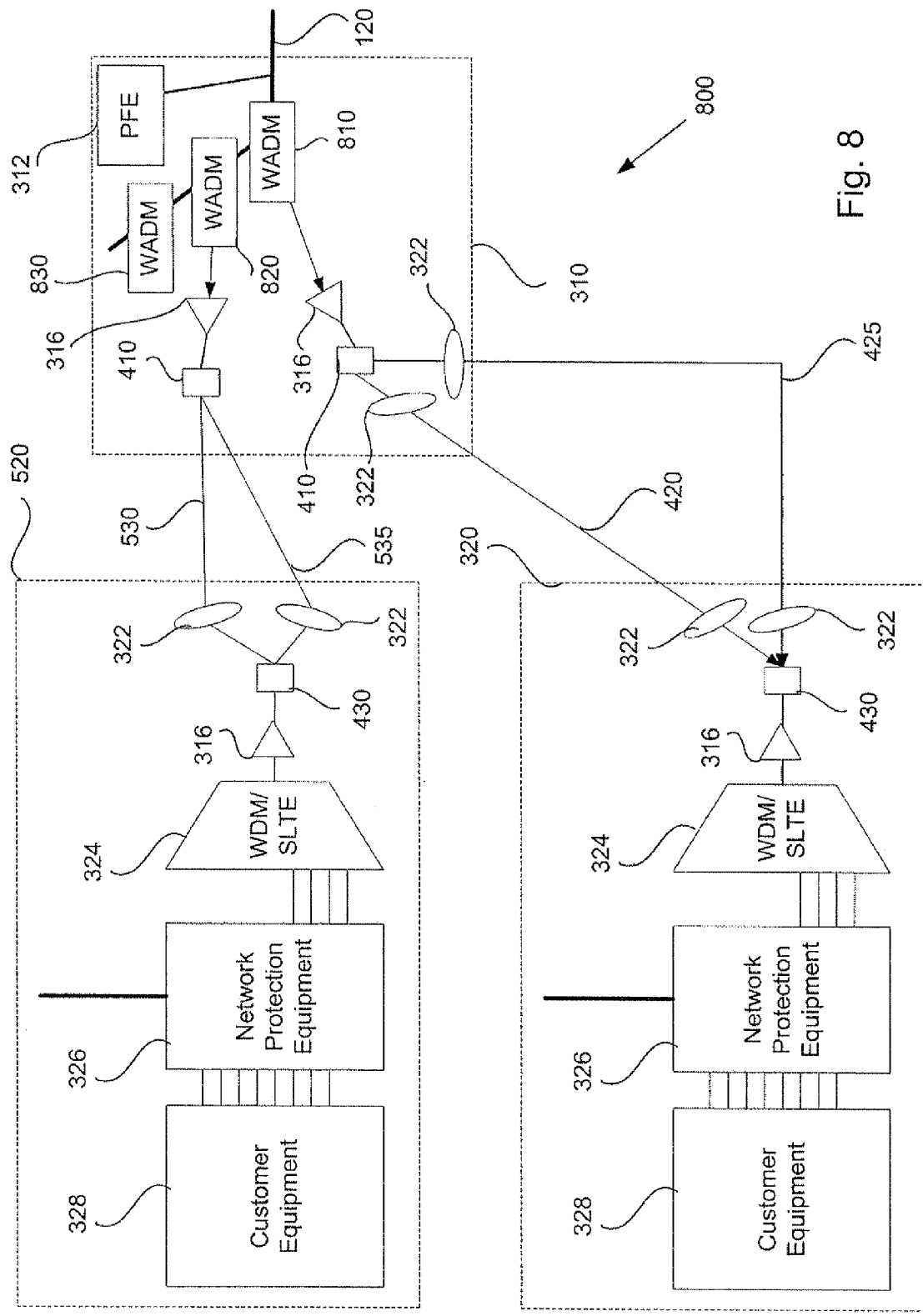
FIG. 8 is a block diagram of an exemplary optical system consistent with the principles of the present invention with wavelength add-drop multiplexers in the cable landing station.

FIG. 8 is a block diagram of an exemplary optical system 800 with a number of wavelength add-drop multiplexers in the cable landing station. Where elements have the same reference numerals as in FIG. 3-7, these elements will not be described again The wavelength add-drop multiplexers (WADMS) 810-830 may be configured to selectively add/drop wavelengths for each POP 320, 520, etc. For example, each of the WADMs 810-830 may be configured to forward a certain set of wavelengths to the POP associated with it. The set of wavelengths sent by a particular WADM 810-830 may be programmed or otherwise fixed remotely. In this way, POPs 320, 520, etc. may dynamically receive fewer or more wavelengths simply by adjusting the WADM units 810-830.

Figure 9:
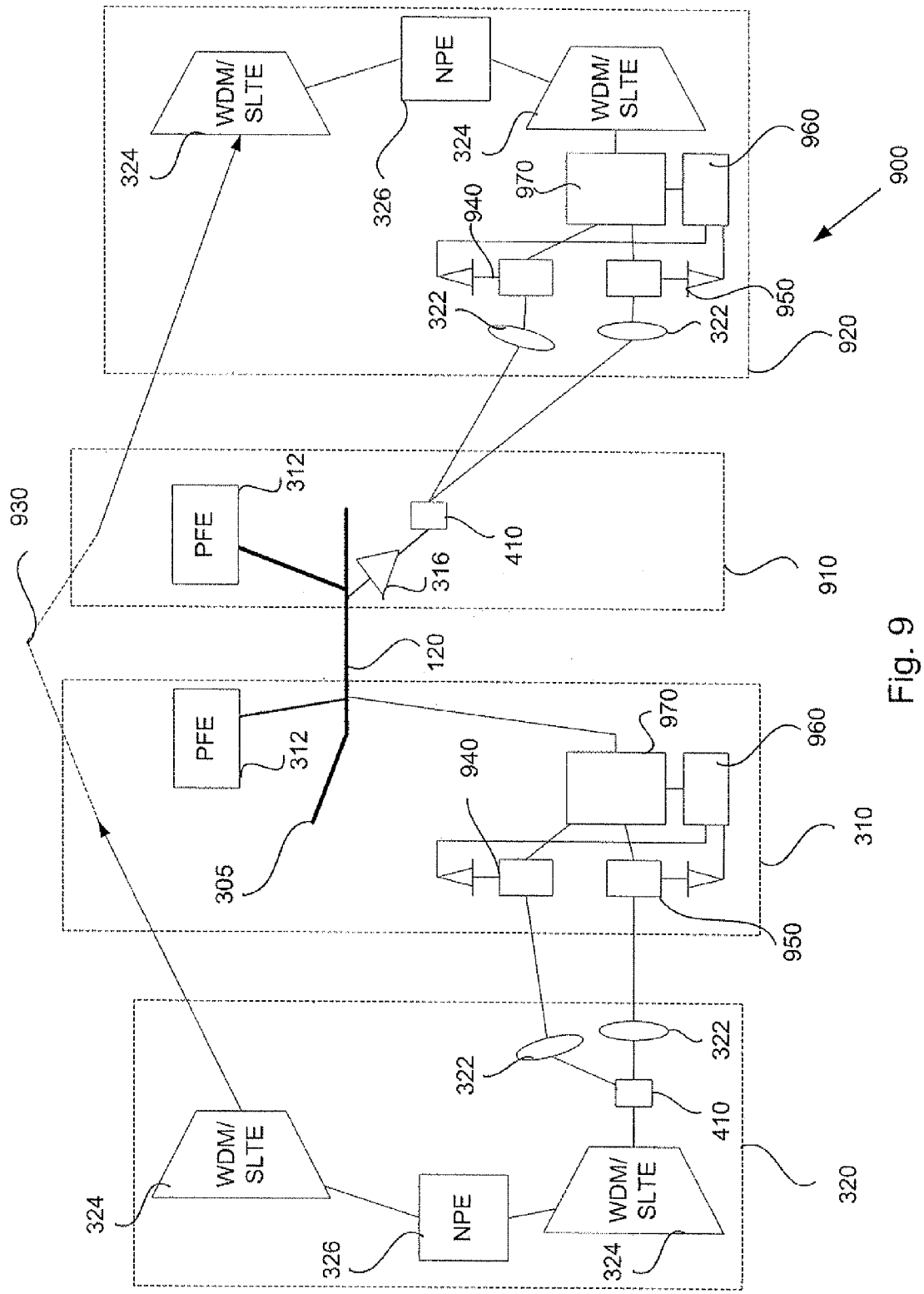
FIG. 9 is a block diagram of an exemplary optical system consistent with the principles of the present invention with an alternate undersea fiber route and sensing switches.

FIG. 9 is a block diagram of an exemplary optical system 900 with an alternate undersea fiber route and sensing switches. Optical system 900 may include a first cable landing station 310, a first POP 320, a second cable landing station 910, and a second POP 920. The first cable landing station 310 and the second cable landing station 910 may be coupled by at least first undersea optical cable 120. Each of the first and second POPs 320 and 920 includes two WDM/SLTE units 324. A diversely routed submarine cable 930 may be coupled between one of the two WDM/SLTE units 324 (hereinafter referred to as the "second WDM/SLTE unit"), The diversely routed submarine cable 930 may, or may not, be connected to the first and second cable landing stations 310 and 910, but in any case the cable 930 may be routed physically apart from the other submarine cable 120 for redundancy.

With reference to the first WDM/SLTE units 324 and their corresponding signal path through undersea cable 120, the first POP 320 and the second cable landing station 910 each includes a 3 dB 50/50 splitter 410. In this manner, system 900 incorporates 1+1 protection between the first POP 320 and the first cable station 310, as well as between the second cable station 910 and the second POP 920.

The first cable station 310 and the second POP 920 may each include a selecting switch which may include a first 2% tap and sensing device 940, a second 2% tap and sensing device 950, a processor 960, and a 1×2 optical switch 970. Sensing devices 940 and 950 may, for example, be photodiodes or optical spectrum analyzers. This selecting switch may be used as the optical switch 430 in any of FIGS. 4-8. The processor 960 may be connected to both of the photodiodes 940/950 and to the 2:1 switch 970. The processor 960 may be configured to control the 2:1 switch 970 to pass on one of the input optical signals based on signal quality and strength measurements from the sensing devices 940/950. The processor 960 may also be configured to communicate with other portions of the system 900.

As mentioned previously, although only one transmission direction (i.e., left to right) is shown in FIG. 9, the system 900 may include fibers and optical hardware for transmission in the opposite direction. Although not shown, the second cable station 910 and the first POP 320 each may include a switch 430, and the POP 320 may include devices 940-970.

SYSTEM OPERATION

Figure 10:
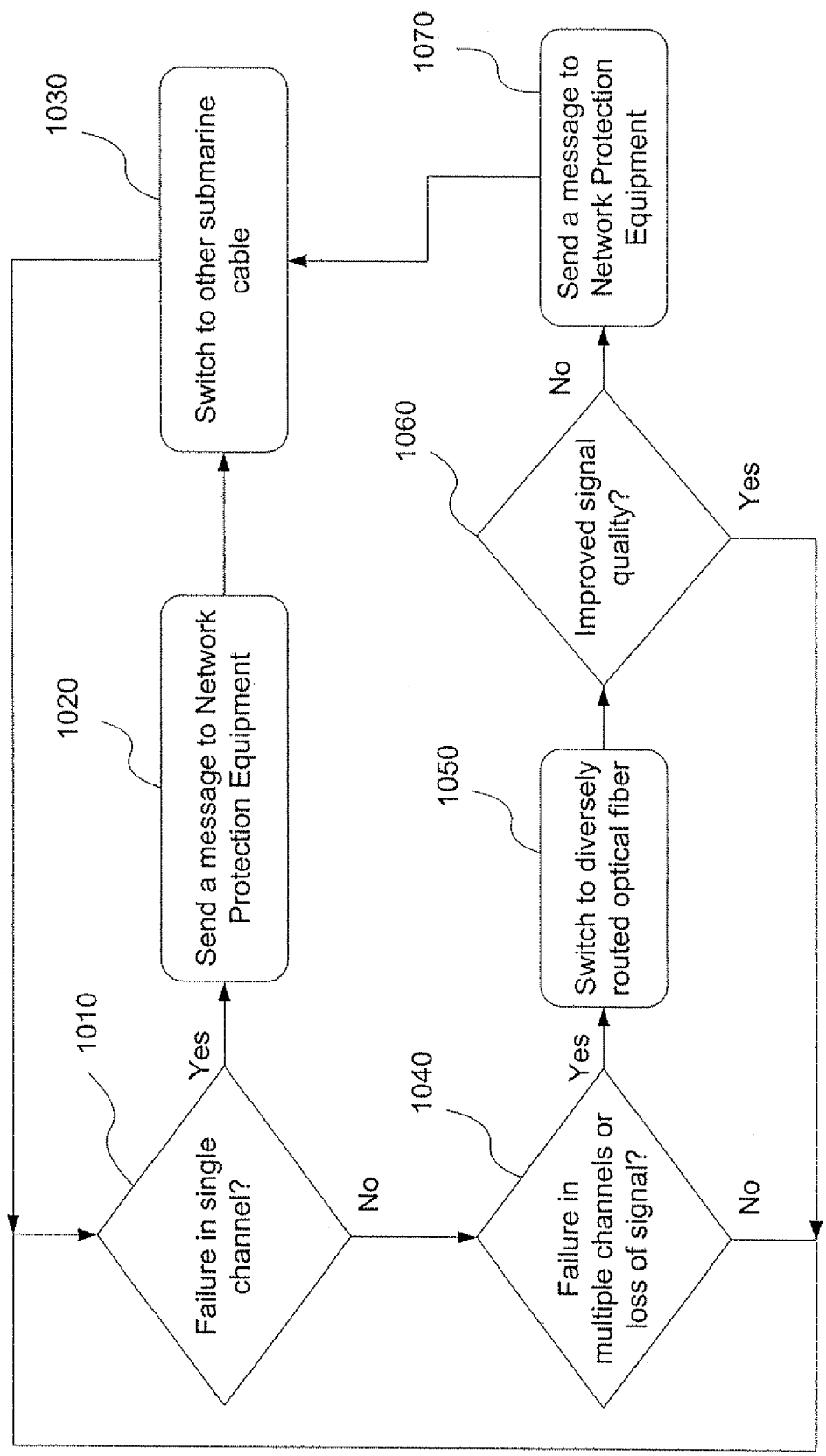
FIG. 10 is a flow chart of failure switch-over processing performed by the system of FIG. 9.

FIG. 10 is a flow chart illustrating exemplary processing performed by the optical system 900. Processing may begin with processors 960 monitoring information from the two taps and sensing devices 940 and 950. Each processor 960 may check whether the information received corresponds to an indication of failure for a single channel of information in one of the terrestrial fiber links [act 1010]. If the processor 960 detects such a failure in a single channel of information, it may wait for a predetermined time period (e.g., 10 msec to allow for self-correction), and then send an alarm to NPE 326 to indicate a single channel failure mode [act 1020]. The NPE 326 may then decide that the problem is most likely attributable to a malfunctioning transceiver in the WDM/SLTE 324 and may decide to switch the communications path to the diversely routed submarine line 930 [act 1030].

If the processors 960 do not detect failure on a single channel, they may monitor for failure on multiple channels or a loss of WDM signal in the fiber [act 1040]. If such a failure is detected, the processor 960 may command its corresponding switch 970 to change to the alternate fiber links [act 1050]. Upon waiting for a predetermined time period (i.e., roughly the amount of time that it takes to trigger the switch 970 and receive data over the other fiber) the processor 960 may again check for multiple channel failures [act 1060]. If the processor 960 continues to detect multiple channel failures, then it may send a signal to the NPE 326 [act 1070]. The NPE 326 may then determine that the submarine link 120 has been cut and switch the communications to the diversely routed submarine line 930 [act 1030]. Otherwise, if switching to the backup terrestrial fiber eliminates the errors, then the corresponding processor 960 can signal the NPE 326 of this information in act 1070. In such a case, the NPE 326 may then initiate processes (e.g., coherent optical time domain reflectometry (COTDR)) to locate the failure in the identified terrestrial link.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, though amplifiers 316 and dispersion compensating fibers (DCF) 322 have been shown at various points in the figures, those skilled in the art will appreciate that more or fewer amplifiers 316 and/or DCOs 322 may be used at possibly different locations within the various systems 300-900 according to requirements and design constraints for these systems. Further, although one or two POPs are shown for ease of explanation, those skilled in the art will appreciate that more or fewer than two POPs may send and receive signals to and from a single cable station. Those skilled in the all will use suitable numbers and types of splitters and switches to provide for additional POPS.

Further, the acts in FIG. 10 need not be implemented in the order shown, nor do all of the acts need to be performed. Moreover, well-known schemes for providing transient protection may be incorporated in the systems and methods described herein by those skilled in the art. One example of such well-known transient protection schemes may include providing optical signal energy during switching events by using a separate laser source with feedback No element act, or instruction used in the description of the present application should be construed as critical or essential to the invention unless explicitly described as such. Also, as used herein, the article "a" is intended to include one or more items. Where only one item is intended, the term "one" or similar language is used, The scope of the invention is defined by the claims and their equivalents.

What is claimed is:

1. A method of performing failure routing in an optical system, comprising:
   determining whether a failure exists in a single channel of an optical signal received on a first terrestrial optical fiber;
   ascertaining whether a failure exists in multiple channels of the optical signal received on a first terrestrial optical fiber or whether a loss of the optical signal has occurred, wherein ascertaining is performed if it is determined that a failure does not exist in a single channel of the optical signal received on the first terrestrial optical fiber;
   switching to a second diversely routed terrestrial optical fiber if said ascertaining ascertains that the failure exists in multiple channels of the optical signal received on a first terrestrial optical fiber or that the loss of the optical signal has occurred;
   verifying whether a failure exists in multiple channels of an optical signal received on the second diversely routed terrestrial optical fiber or whether a loss of the optical signal has occurred; and
   switching to a diversely routed submarine cable if said verifying determines that the failure exists in multiple channels of the optical signal received on the second diversely routed terrestrial optical fiber.

2. The method of claim 1, further comprising:
   transmitting a message to network protection equipment that indicates a failure exists if it is determined that a failure exists in the single channel of the optical signal received on the first terrestrial optical fiber.

3. The method of claim 1, further comprising:
   switching to the diversely routed submarine cable if said determining determines that the failure exists in the single channel of the optical signal received on the first terrestrial optical fiber.

4. The method of claim 1, further comprising:
   transmitting a message to network protection equipment that indicates a failure exists in multiple channels of the optical signal received on the first terrestrial optical fiber if it is ascertained that a failure exists in multiple channels of the optical signal received on a first terrestrial optical fiber or that a loss of the optical signal has occurred.

* * * * *